(12) United States Patent
Weisenburger

(10) Patent No.: US 11,535,341 B2
(45) Date of Patent: *Dec. 27, 2022

(54) SURFBOARD WITH REPLACEABLE BATTERY

(71) Applicant: WBV Weisenburger Bau+Verwaltung GMBH, Rastatt (DE)

(72) Inventor: Nicolai Weisenburger, Baden-Baden (DE)

(73) Assignee: WBV Weisenburger Bau+Verwaltung GmbH, Rastatt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/956,559

(22) PCT Filed: Dec. 20, 2018

(86) PCT No.: PCT/EP2018/086129
§ 371 (c)(1),
(2) Date: Jun. 20, 2020

(87) PCT Pub. No.: WO2019/122087
PCT Pub. Date: Jun. 27, 2019

(65) Prior Publication Data
US 2021/0024178 A1 Jan. 28, 2021

(30) Foreign Application Priority Data
Dec. 21, 2017 (DE) .......................... 102017130946.2

(51) Int. Cl.
*B63B 32/10* (2020.01)
*B60L 50/64* (2019.01)
(Continued)

(52) U.S. Cl.
CPC .............. *B63B 32/10* (2020.02); *B60L 50/64* (2019.02); *B63H 21/17* (2013.01); *H01M 50/20* (2021.01);
(Continued)

(58) Field of Classification Search
CPC ...... B63B 32/10; B60L 50/64; B60L 2200/32; B63H 21/17; H01M 50/20; H01M 2220/20
See application file for complete search history.

(56) References Cited

U.S. PATENT DOCUMENTS 2,944,864 A 7/1960 Krivulka
6,134,115 A 10/2000 Sim et al.
(Continued)

FOREIGN PATENT DOCUMENTS

CN 205675195 U 11/2016
DE 10 2009 041 397 A1 3/2011
(Continued)

OTHER PUBLICATIONS

JetSurfing Nation: Waterwolf and Munich Rifer Surf. Oct. 13, 2017, Videosequenzen 0:10/16:34, 1:33/16:34, 1:50/16:34.www.youtube.com.
(Continued)

*Primary Examiner* — Stephen P Avila
(74) *Attorney, Agent, or Firm* — Bay State IP, LLC

(57) ABSTRACT

The invention relates to a surfboard with an electric drive (2), a battery for the electric drive (2), said battery being arranged in a battery housing (3), a first recess (4) for the battery housing (3), and a handle (5) on the battery housing (3), wherein the handle (5) is designed as a D-shaped bracket handle which is pivotally mounted on opposite sides (6) of the battery housing (3) and has a locking mechanism (7) for the first recess (4).

13 Claims, 7 Drawing Sheets

Figure 1:
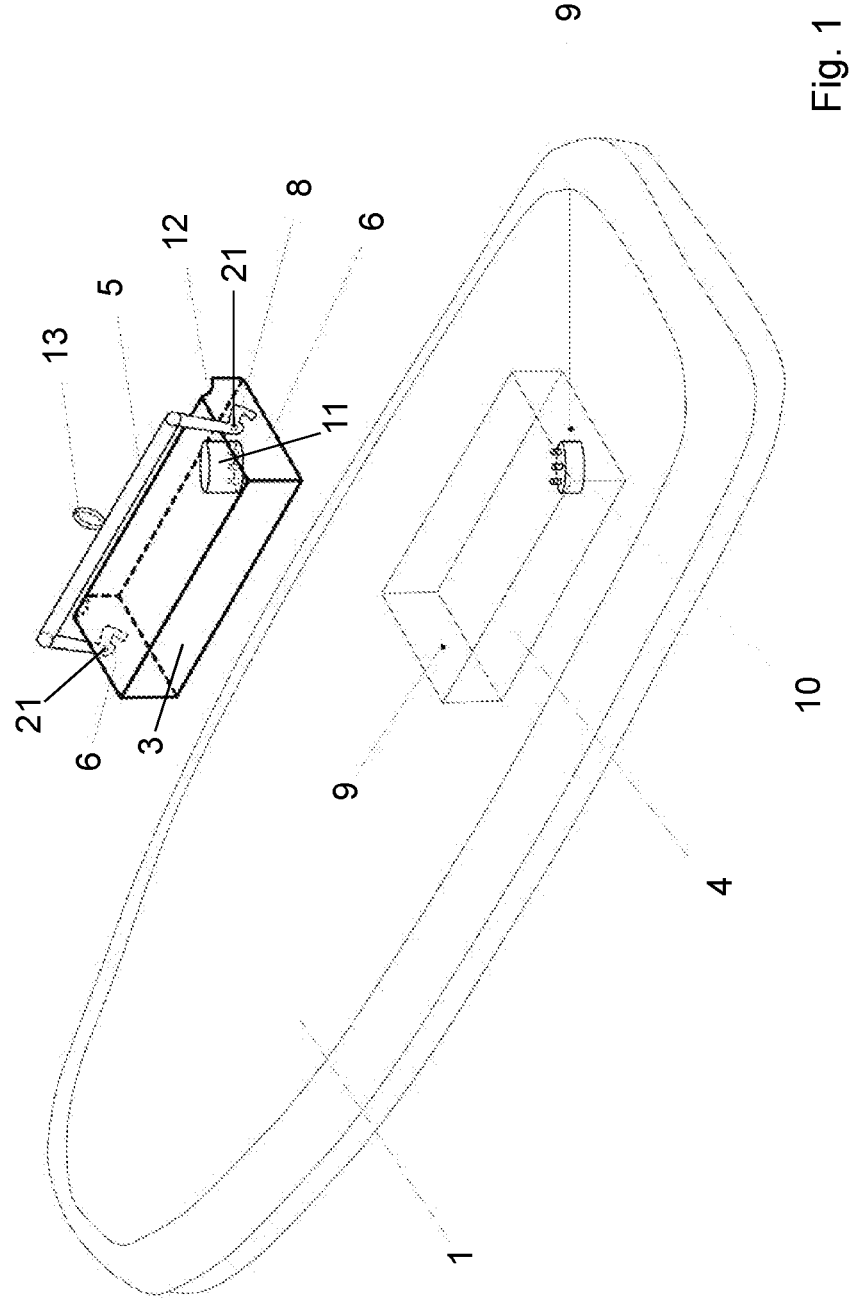

(51) Int. Cl.
*H01M 50/20* (2021.01)
*B63H 21/17* (2006.01)

(52) U.S. Cl.
CPC ...... *B60L 2200/32* (2013.01); *H01M 2220/20* (2013.01)

(56) References Cited

U.S. PATENT DOCUMENTS

| | | | |
|---|---|---|---|
| 9,359,044 B2* | 6/2016 | Langelaan | B63H 11/04 |
| 2001/0042498 A1 | 11/2001 | Burnham | |
| 2004/0142753 A1 | 7/2004 | Beadell et al. | |
| 2011/0201238 A1 | 8/2011 | Rott et al. | |
| 2016/0114866 A1* | 4/2016 | Pendle | B63B 32/51 441/66 |
| 2021/0114695 A1* | 4/2021 | Weisenburger | H01M 50/209 |

FOREIGN PATENT DOCUMENTS

| | | |
|---|---|---|
| DE | 20 2011 051 071 U1 | 12/2011 |
| DE | 102013216271 A1 | 2/2015 |
| KR | 20170000622 A | 1/2017 |

OTHER PUBLICATIONS

Best-Boats24: Elektrisches Jet Surfboard—wichtige Tipps zum Lampuga Air und Air Plus. Sep. 6, 2016, Videosequenzen 1:08/9:57, 2:26/9:57, 4:38/9:57.www.youtube.com.

\* cited by examiner

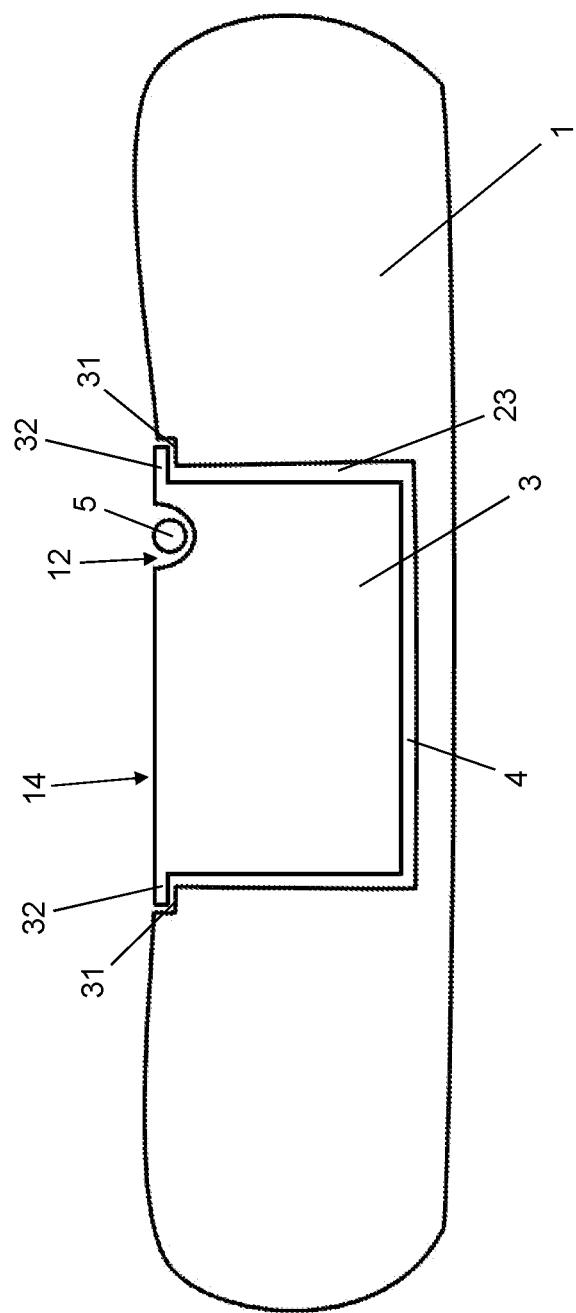

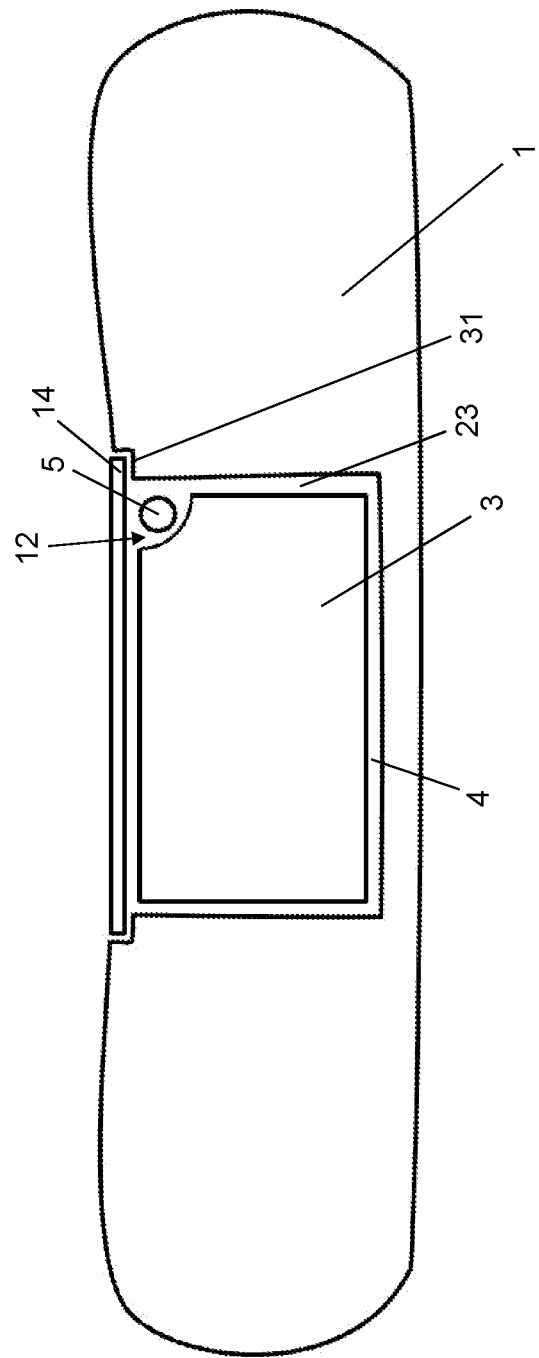

SURFBOARD WITH REPLACEABLE BATTERY

CROSS REFERENCE TO RELATED APPLICATION

This application is for entry into the U.S. National Phase under § 371 for International Application No. PCT/EP2018/086129 having an international filing date of Dec. 20, 2018, and from which priority is claimed under all applicable sections of Title 35 of the United States Code including, but not limited to, Sections 120, 363, and 365(c) and which in turn claims priority under 35 USC 119 to German Patent Application No. 102017130946.2 filed on Dec. 21, 2017.

The invention relates to a surfboard with an electric drive and a battery for the electric drive, said battery being arranged in a battery housing, and a first recess for the battery housing, and a handle on the battery housing.

Naturally, surfboards are well known. In English language usage, surfboards are boards which do not have a sail and on which a surfer can ride, powered by a wave. The German word for surfing translates as "riding the waves".

The surfboard according to the invention relates to this type of sport. The surfer stands on the surfboard and moves over the water preferably without a sail and without propulsion generated by means of the wave.

The surfboard according to the invention has an electric drive. Surfboards with an electric drive are known for example from DE 20 2011 051 071. Powered surfboards are not dependent on a heavy swell, but can also be used in bodies of water which are windless and have little surf. The electric drive of the known surfboard is supplied with power by means of a battery arranged in the surfboard. For charging of the battery the surfing activity must be interrupted, the surfboard must be removed from the water and the battery must be charged by means of a conventional mains power connection. As a result the surfboard cannot be used for sporting activities while the battery is being charged. A usage time of the surfboard determined by the running time of the battery follows a charging phase which is at least equally long, the duration of which is determined substantially by the battery charging time.

The waiting phases for charging the battery are perceived as disadvantageous by the surfer.

Therefore it is an object of the present invention to provide a surfboard which avoids or at least reduces the above-mentioned disadvantage.

This object is achieved by a surfboard referred to in the introduction with the features of claim 1.

Preferred embodiments are the subject matter of the subordinate claims.

The surfboard according to the invention has an electric drive, preferably in the rear region of the surfboard; this is preferably a jet drive. The jet drive has an opening on an underwater surface of the surfboard as well as a water channel which runs from the underwater surface to a nozzle on the rear end face of the surfboard. The nozzle can be designed to be pivotable or not pivotable. A propeller is provided in the water channel. In this case due to the high speed of the propeller water is sprayed out of the nozzle towards the rear against the direction of travel, so that the surfboard is given the necessary forward propulsion. The propeller is connected by means of a drive train to an electric motor which is supplied with power via the battery. The electric motor is preferably electrically conductively connected to a controller which transmits control signals to the motor transmitted and thus controls the output of the electric drive, that is to say the speed of the surfboard. The controller preferably receives the necessary control signals via a remote control.

According to the invention the battery of the electric drive which supplies the electric motor with power is replaceable. It is arranged in a battery housing which has a handle, preferably designed as a bracket handle, which is mounted pivotably on opposing sides of the battery housing. The battery housing can be inserted replaceably into a first recess. The first recess can be arranged in the hull of the surfboard or also in a separate drive unit, which in turn is then pushed in, inserted, etc., into the hull.

The handle has a locking mechanism with the first recess in the hull of the surfboard, wherein the handle preferably has on each of the opposing sides a projection which, during insertion of the battery housing into the first recess in the hull of the surfboard, by folding down of the handle of the battery housing, in each case preferably engages under a lug arranged on the inner wall of the first recess in the hull of the surfboard. During removal of the battery housing from the first recess in the hull of the surfboard, the locking mechanism releases the lug by folding up of the handle. In the folded-up state the bracket of the handle is at the greatest possible distance from the battery housing, and in the folded-down state it is at the smallest possible distance.

The first recess for accommodating the battery housing in the hull of the surfboard is preferably arranged below the deck of the surfboard. The inserted battery can be covered retrospectively by a region of the deck or the upper side of the battery housing can be part of the deck.

The battery housing with the battery can be inserted with only one hand and with only one handle into the first recess in the hull of the surfboard, and the locking mechanism can be triggered automatically by folding down of the handle, so that the battery housing with the battery is fixed in the first recess. Likewise, with only one hand and with only one handle, by folding up of the handle and thus automatic release of the locking, the fixing of the battery housing in the first recess can be overridden and the battery housing with the battery can be removed from the first recess.

The battery is preferably connected to the electric motor in the surfboard via the battery housing by a high-current plug. For this purpose a pylon can be mounted on the base wall of the recess. As a counterpart to the pylon, a second recess with a socket to accommodate the pylon is provided on the underside of the battery housing, which faces a base of the recess during insertion of the battery housing. After insertion of the battery housing into the first recess in the hull of the surfboard and folding down of the handle, the socket and the pylon are arranged in relation to one another so that they form an electrical plug contact, preferably a high-current plug contact. In a further variant of an embodiment, the pylon and the socket can also be interchanged.

The battery is preferably designed in one piece with precisely one battery housing. However, it can also be in two, three or more parts and can consist of one, two or more individual battery housings, each of which can have an associated handle. Alternatively, two handles can be provided for each battery housing.

According to the invention, the battery preferably has a rated voltage of 24 V to 100 V. It preferably has a capacitance of 25 Ah to 100 Ah. Its output is preferably in the range from 0.8 kWh to 10 kWh. The battery in the battery housing is preferably assigned an IP protection rating of 67 and higher, in particular the IP protection rating 67, 68 or 69.

According to a first embodiment, the surfboard can consist of a continuously solid hull. In the first embodiment the battery is provided in the interior of the hull and is arranged in a battery housing which is arranged in the first recess in the continuously solid hull, preferably in the rear part of the surfboard.

In a second embodiment the surfboard has an inflatable hull and a drive unit which at least also forms a stern of the surfboard and is preferably releasably connected to the inflatable hull. As a result the surfboard can be transported more easily. In the second embodiment the drive unit includes the electric drive, and the battery is arranged in the first recess in the drive part of the hull. The inflatable hull component advantageously has two lateral arms which engage in a U shape around the drive unit.

In a preferred second embodiment of the invention the inflatable hull component is manufactured from a drop-stitch material, in which two or more synthetic fabric webs, preferably denier polyester fabric webs, are laid one above the other. The two synthetic fabric webs are connected to one another by a plurality, i.e. thousands, of polyester threads. These polyester threads predetermine the envisaged shape of the board when the space between the fabric webs is filled with compressed air.

The polyester threads are sewn to the two fabric webs on both faces. The two fabric webs which are sewn to one another form the support structure which gives the hull component its mechanical strength in the inflated state. The two fabric webs which are connected to one another are cut to the required shape. The upper and lower fabric webs are coated with PVC layers, preferably with three layers, and are pressed and bonded layer by layer. The faces are glued, overlapping, to the seam strip and are pressed, so that the airtight rump component is produced.

The drop-stitch method makes it possible to produce the inflatable body component with outstanding mechanical strength properties, which withstand not only tensile loads but also compressive loads and shearing loads. The drop-stitch outer skin of the inflatable hull component is airtight and in the inflated state is exceptionally resistant to deformation, so that a surfer can stand and surf on the hull component whilst retaining the external shape of the inflated hull component. The inflatable hull component is filled with air under high pressure. The filling can take place by means of an air pump or a compressor. The compressor can be supplied with electrical energy by batteries incorporated in the surfboard.

The inflatable hull component manufactured from the drop-stitch material is preferably low-noise because the volume of sound generated by the breaking of waves, but also by the electric drive, is damped by the hull. The inflatable hull component is subject to little vibration during operation because vibrations are reduced by the drop-stitch material. Since the inflatable hull component is slightly deformable, impacts and waves etc. are advantageously absorbed. Furthermore, it is advantageous that the softer hull causes fewer injuries, for example if the surf board collides with the surfer in the event of the surfer falling off.

While practising the sport the surfer stands on the deck of the surfboard and keeps his balance for example by gripping a rope which is fastened to the bow of the surfboard and on which a handle is preferably located.

The deck is formed by an upper side of the surfboard.

In the first embodiment the deck is formed by the upper side of the solid hull.

In the second embodiment a part of the deck is formed by the upper side of the drive unit and another part is formed by the upper side of the inflated hull part.

After insertion of the battery housing into the first recess in the hull of the surfboard the handle of the battery housing can preferably be recessed below the deck. Particularly preferably, after the handle has been folded down it can be recessed in a third recess in the battery housing. The handle preferably has a lifting device. This can be for example a strap, a loop or a projection or any device by means of which the handle can be gripped and lifted. Alternatively, the battery housing or the surfboard has a fourth recess which enables the gripping and lifting of the handle.

After the insertion of the battery housing the upper side of the surfboard preferably also forms a flat deck. For this purpose an upper side of the battery housing can be designed in various ways.

In a first embodiment of the battery housing the upper side of the battery housing and the upper side of the surfboard form a flat deck for the surfer. In this case a depth of the first recess is dimensioned so that it corresponds to the height of the battery housing. After the insertion of the battery housing the upper side of the surfboard and the upper side of the battery housing are aligned. The handle, preferably the bracket handle, which is folded in is likewise aligned with the surface, so that the surfer can move without danger on the deck.

In a second embodiment of the battery housing a side wall of the first recess has a groove, preferably a peripheral groove, along the upper side of the surfboard, and the upper side of the battery housing has a peripheral overlap which rests on the groove or lies in the groove after the insertion of the battery housing into the first recess. The upper side of the surfboard, the overlap and the upper side of the battery housing form a flat deck for the surfer. Here too, the depth of the first recess corresponds to the height of the battery housing.

In a third embodiment of the battery housing a separate cover is provided, which can be inserted into the groove running round the side wall of the first recess along the upper side of the surfboard, so that a flat deck is formed by the upper side of the cover and the upper side of the surfboard. The battery housing is arranged separately, preferably spaced apart by a small gap, in the hull below the cover. The height of the battery housing is smaller than the depth of the recess by at least the thickness of the cover, so that the cover can be arranged above the battery housing and nevertheless a flat deck is formed.

The separate cover can be clamped in the groove or can be fastened by additional fastening means such as clamp closures, magnets etc. The cover is preferably a solid lid which does not bend even when stepped on.

Figure 2:
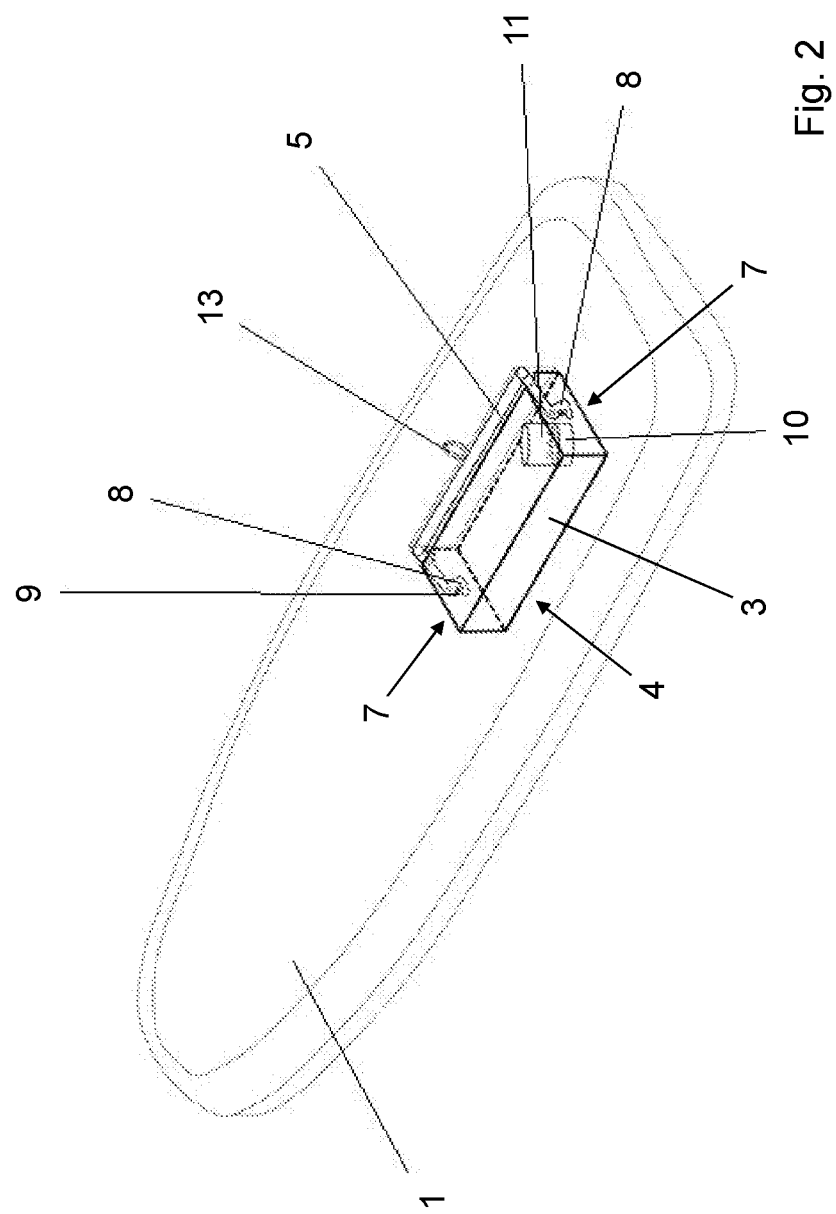
Figure 3:
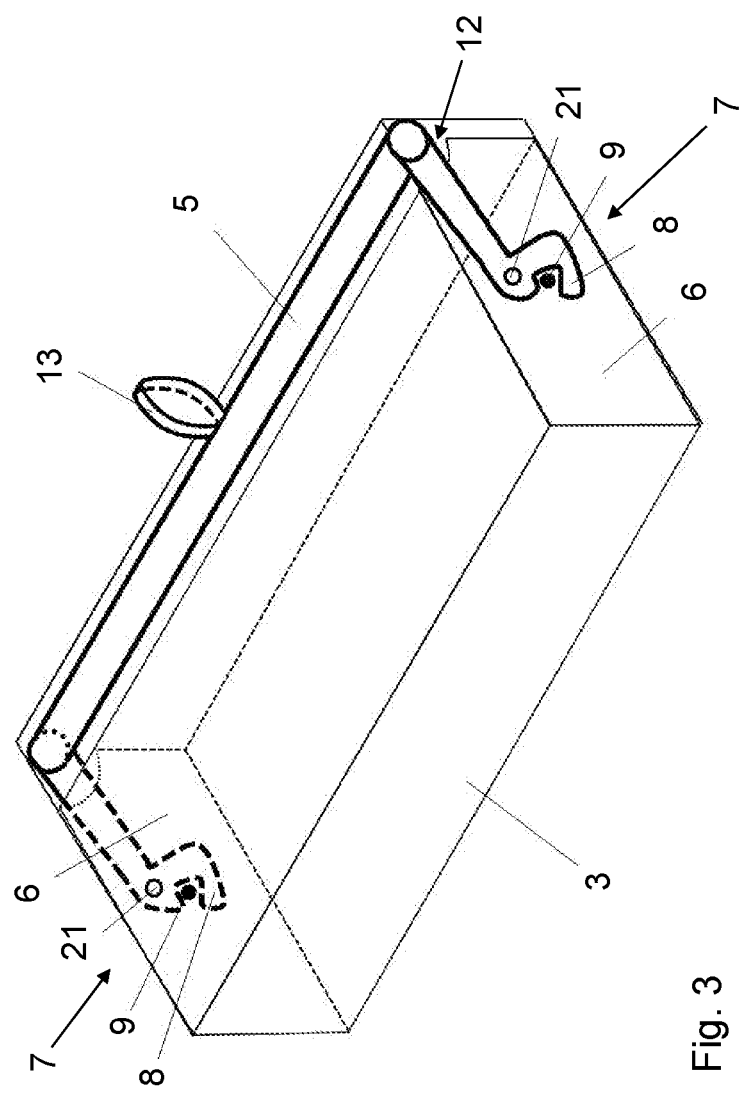
Figure 4:
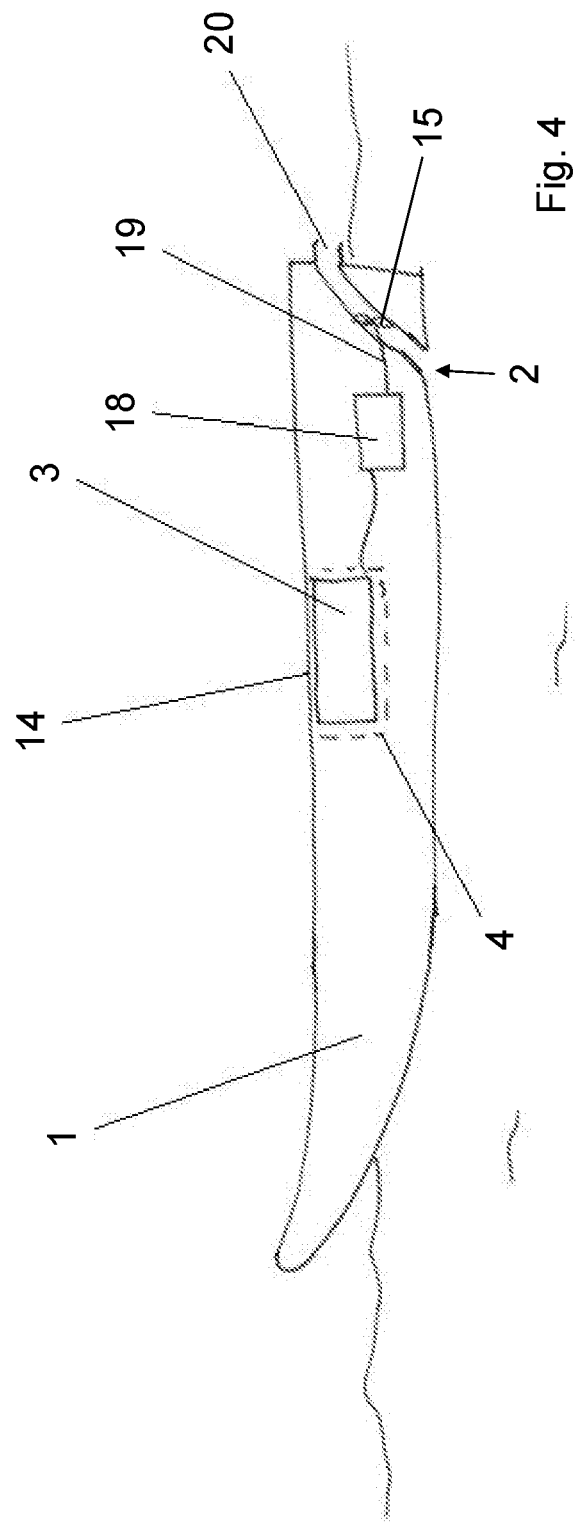
Figure 5:
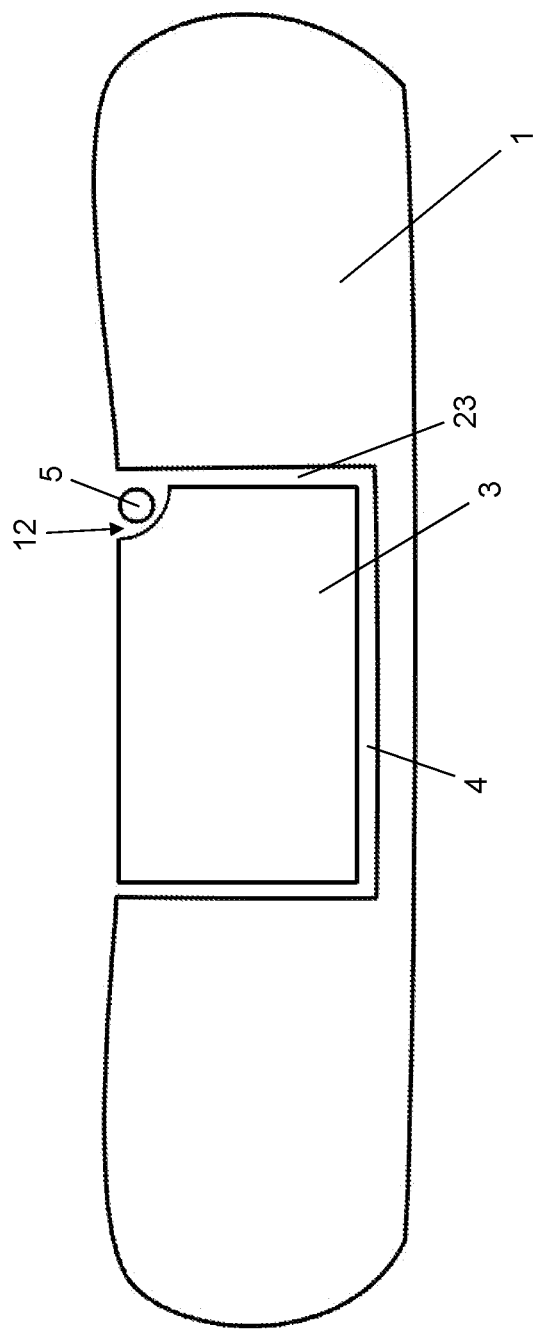

The invention is described with reference to an exemplary embodiment in seven drawings. In the drawings:

FIG. 1 shows a surfboard according to the invention with a first recess in the hull and a battery housing which is not inserted into the first recess, FIG. 2 shows a surfboard according to the invention with the first recess in the hull and the battery housing, with the bracket handle folded down, inserted into the first recess, FIG. 3 shows a detail of the battery housing with locked bracket handle according to FIG. 2 inserted into the first recess, FIG. 4 shows a sectional view of the surfboard according to the invention, FIG. 5 shows a sectional view of a first embodiment of the battery housing, FIG. 6 shows a sectional view of a second embodiment of the battery housing with overlapping edge, FIG. 7 shows a sectional view of a third embodiment of the battery housing with separate cover.

FIG. 1 shows a schematic oblique view of a surfboard 1 according to the invention with a first recess 4 in the hull of the surfboard 1 and a battery housing 3, wherein the battery housing 3 is not yet inserted into the first recess 4.

The surfboard 1 has a continuously solid hull in a first embodiment. The first recess 4 is arranged in the rear part of the surfboard 1. The battery housing 3 has a bracket handle 5 which is mounted pivotably on centres of rotation 21 on opposite faces 6 of the battery housing 3. The bracket handle 5 is illustrated in the folded-up state in FIG. 1.

A pylon 10 is located on a base wall of the first recess 4. A second recess 11 with a socket is located on an underside of the battery housing 3. It constitutes the counterpart to the pylon 10.

FIG. 2 shows the surfboard according to FIG. 1, wherein the battery housing 3 is inserted in the first recess 4 and the bracket handle 5 is folded down.

The pylon 10 has been accommodated by the second recess 11, which is designed as a socket. The socket and the pylon 10 form an electric plug contact.

FIG. 3 shows a view of a detail of the battery housing 3 according to FIG. 2, which is inserted in the first recess 4 with the bracket handle 5 folded down. On the opposing sides 6 of the battery housing 3 the bracket handle 5 has projections 8 which, as the bracket handle 5 is folded down, each engage under a lug 9 arranged on the inner wall of the first recess 4 on opposing sides. As the bracket handle 5 is folded down, the bracket handle 5 is rotated about the centres of rotation 21 so that the projections 8 of the bracket handle 5 automatically engage under the lugs 9 of the first recess 4 and trigger the locking mechanism 7. After insertion into the first recess 4 the battery housing 3 is firmly fixed by folding down of the bracket handle 5. After the bracket handle 5 has been folded down it is recessed in a third recess 12 in the battery housing 3. In FIG. 3 a loop is provided as a lifting device 13 for the bracket handle 5. If the bracket handle 5 is lifted on the loop, it rotates about the centres of rotation 21 so that the projections 8 clear the lugs 9 of the first recess 4 and the locking mechanism 7 is released.

FIG. 4 shows a sectional view of the surfboard 1 according to the invention. The surfboard 1 has a continuously solid hull according to a first embodiment. The first recess 4 is arranged in the rear part of the hull in the upper side of the board. It has a cover 14, the outer side of which forms a continuous surface with the upper surface of the surfboard. The battery is inserted in the battery housing 3 in the first recess 4, and the cover 14 is closed. The bracket handle 5 of the battery housing 3 is folded down and recessed below a deck. The battery supplies power to an electric motor 18 of a jet drive 2. The jet drive 2 has a water inlet on the underwater surface of the surfboard as well as a water channel, a nozzle 20 at the rear end of the water channel and a rotor 15 which is connected by means of a drive train 19 to the electric motor 18 and during rotation pushes water towards the rear through the water channel, which then sprays out through the nozzle 20 contrary to the direction of travel and thus gives the surfboard 1 the necessary forward propulsion.

FIGS. 5, 6 and 7 show various embodiments of the battery housing 3, in particular an upper side facing the upper side of the board.

In FIG. 5 the battery housing 3 is so designed that the upper side of the battery housing 3 forms a flat surface with the upper side of the surfboard 1, so that an overall deck is produced. A gap 23 between the battery housing 3 and the side wall of the first recess 4 is shown wider in FIG. 5 than it would be if drawn to scale. The bracket handle 5 is folded into the third recess 12 of the battery housing 3, so that an upper side of the bracket handle 5 is likewise arranged in a plane with the upper side of the battery housing 3 and with the upper side of the surfboard 1 and forms an overall deck.

FIG. 6 shows a second embodiment of the battery housing 3, the upper side of which is greater than a cross-sectional surface of the first recess 4. The upper side of the battery housing 3 has an overlap 32 and thus forms a cover 14 or a lid which is formed integrally with the battery housing 3 and overlaps lateral walls of the first recess 4. An end of the lateral wall of the first recess 4 on the upper side of the board has a circumferential groove 31 into which the overlap 32 is laid. A height of the groove 31 corresponds to a thickness of the overlap 32, so that after the insertion of the battery housing 3 into the first recess 4 a flat deck is formed by the upper side of the surfboard 1 and the upper side of the battery housing 3. The third recess 12, which accommodates the folded-down bracket handle 5, is introduced in the upper side of the battery housing 3. With the battery housing 3 inserted, a penetration of water into the first recess 4 can be prevented by a seal which is not shown here, for example a rubber seal, between the overlap 32 and the groove 31.

FIG. 7 shows a third embodiment of the battery housing 3 according to the invention. The battery housing 3 is completely inserted into the first recess 4, and in fact is inserted deeper than in the first embodiment according to FIG. 5. The circumferential side wall of the first recess 4 again has the groove 31, but in the third embodiment a separate non-slip cover 14 is laid into this groove. In this case the height of the battery housing 3 is so dimensioned that in the inserted state it is positioned below or at the same height as a lower contact surface of the groove 31, so that the cover 14 can be laid into the groove 31 above the battery housing 3 and preferably a small air gap remains between the upper side of the battery housing 3 and an underside of the cover 14. The cover 14 itself has an eyelet, hole or the like (not shown), with the aid of which it can be removed from the groove 31. The cover 14 can be clamped in the upper side of the surfboard in the groove 31, or additional fastening means (not shown) in the form of clamping closures, magnets or the like can be provided. With the battery housing 3 inserted, penetration of water into the first recess 4 can be prevented by a seal (not shown here), for example a rubber seal, between the cover 14 and the groove 31.

LIST OF REFERENCE NUMERALS 1 surfboard
2 electric drive/jet drive
3 battery housing
4 first recess
5 bracket handle
6 opposing sides
7 locking mechanism
8 projection
9 lug
10 pylon
11 second recess
12 third recess
13 lifting device/loop
14 cover
15 rotor
18 electric motor
19 drive train 20 nozzle
21 centre of rotation
23 gap
31 groove
32 overlap

The invention claimed is:

1. A Surfboard comprising: an electric drive (2), and
a battery for the electric drive (2), said battery being arranged in a battery housing (3),
a first recess (4) for the battery housing (3), and
a handle (5) on the battery housing (3),
wherein the handle (5) is designed as a bracket handle, which is mounted pivotably on opposite sides (6) of the battery housing 3 and
a locking mechanism (7) with the first recess (4) characterized in that the handle (5) has a projection (8) on each of the opposing sides (6) which in each case engages under a lug (9) inside the first recess (4); and
wherein the opposing sides (6) of the battery housing (3) are straight and the projection (8) is protruding sideways from the respective opposing side.

2. Surfboard according to claim 1, characterised in that as locking mechanism (7) during insertion of the battery housing (3) into the first recess (4), by folding down of the handle (3), the projection (8) engages under the pin (9) and frees the lug (9) by folding up of the handle (5) during removal of the battery housing (3).

3. Surfboard according to claim 1, characterised in that a pylon (10) is provided on the base wall of the first recess (4) and the battery housing (3) has a second recess (11) with a socket to accommodate the pylon (10), wherein after insertion of the battery housing (3) into the first recess (4) and engagement of the projection (8) under the lug (9) by folding down of the handle (5), the socket and the pylon (10) are arranged so that they form an electrical plug contact.

4. Surfboard according to claim 3,
characterised in that the plug contact is a high-current plug contact.

5. Surfboard according to claim 1, characterised in that the handle (5) can be recessed below a deck.

6. Surfboard according to claim 5,
characterised in that after the handle 5 has been folded down it is recessed in a third recess 12 in the battery housing 3.

7. Surfboard according to claim 5, characterised in that the handle (5) has a lifting device (13) exhibits.

8. Surfboard according to claim 1, characterised in that the first recess (4) is arranged in an upper side of the surfboard (1).

9. Surfboard according to claim 1, characterised in that the first recess (4) is arranged in the rear part of the surfboard.

10. Surfboard according to claim 9, characterised in that an upper side of the battery housing (3) and the upper side of the surfboard (1) form a flat deck.

11. Surfboard according to claim 8, characterised in that on the upper side of the surfboard (1) a side wall of the first recess (4) forms a groove (31) into which a cover (14) is inserted and an upper side of the cover (14) and the upper side of the surfboard (1) form a flat deck.

12. Surfboard according to claim 11, characterised in that the side wall of the first recess (4) forms the groove (31) on the upper side of the surfboard, and the upper side of the battery housing (3) forms an overlap (32), and the overlap (32) lies in the groove (31) and the upper side of the battery housing (3) with the overlap (32) and the upper side of the surfboard (1) for the flat deck.

13. Surfboard according to claim 1, characterised by an inflatable hull component and a drive unit and characterised in that the battery and the electric drive (2) are arranged in the drive unit and the drive unit is arranged releasably on the hull component.

* * * * *